No. 840,305. PATENTED JAN. 1, 1907.
E. FAHRNEY.
ROAD GRADER.
APPLICATION FILED MAY 3, 1906.
3 SHEETS—SHEET 1.
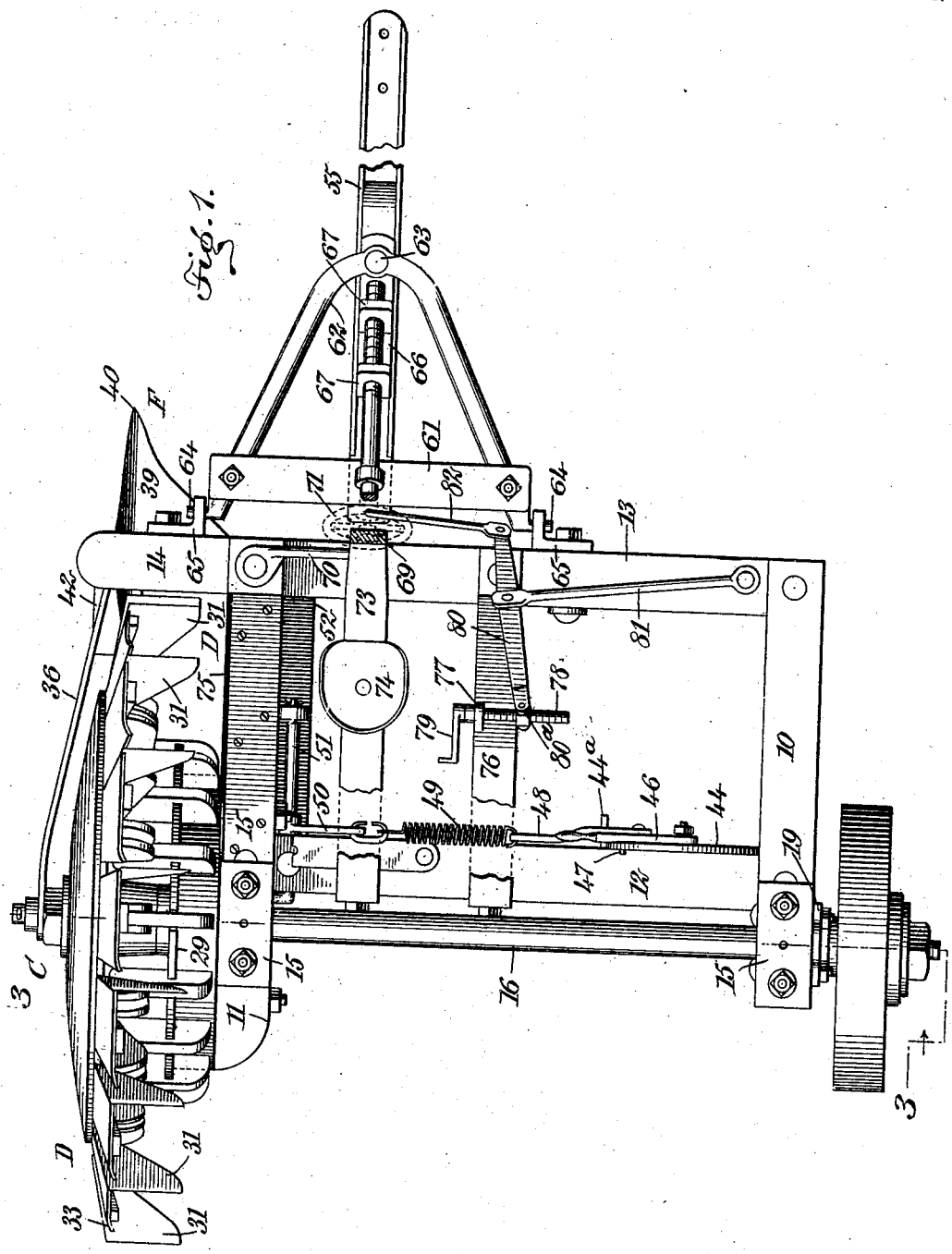
WITNESSES
INVENTOR
Ezra Fahrney
BY
ATTORNEYS

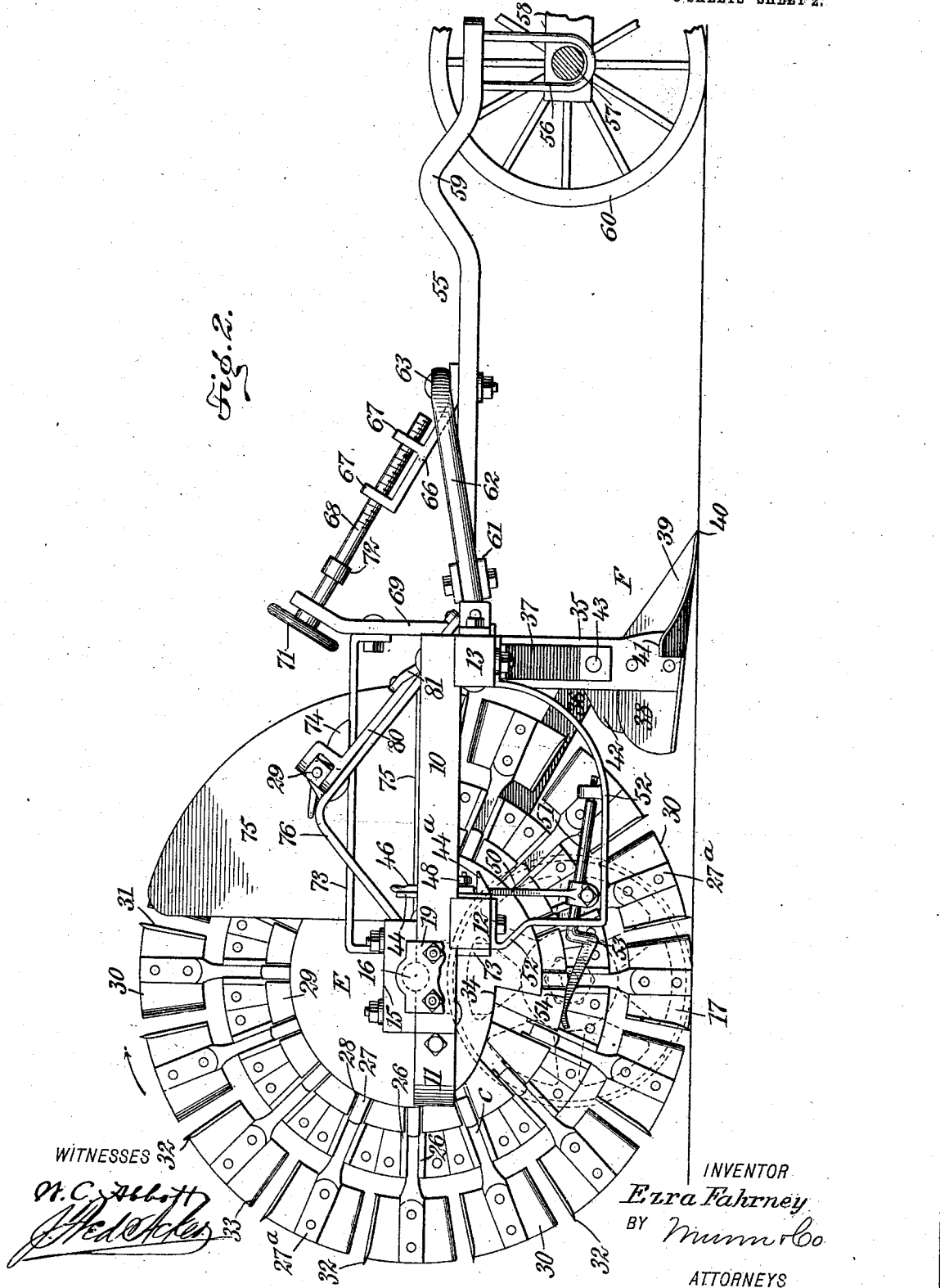

No. 840,305. PATENTED JAN. 1, 1907.
E. FAHRNEY.
ROAD GRADER.
APPLICATION FILED MAY 3, 1906.
3 SHEETS—SHEET 3.
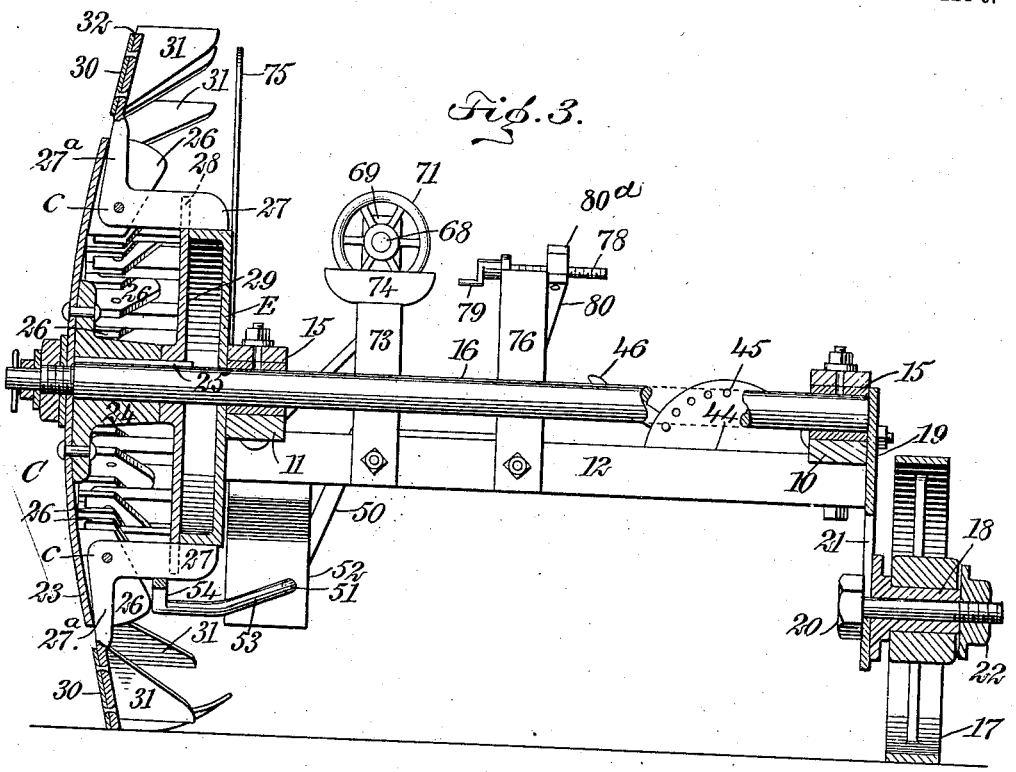
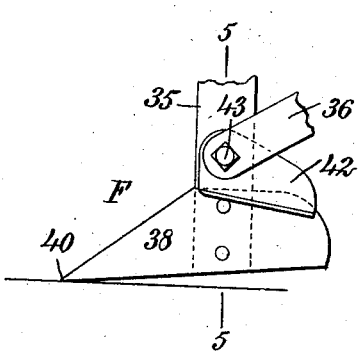
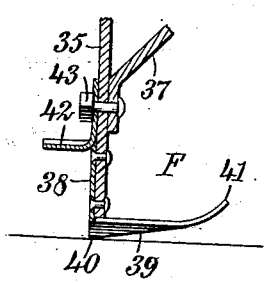
WITNESSES
INVENTOR
Ezra Fahrney
BY
ATTORNEYS

UNITED STATES PATENT OFFICE.

EZRA FAHRNEY, OF DEEP RIVER, IOWA.

ROAD-GRADER.

No. 840,305.　　　　Specification of Letters Patent.　　　　Patented Jan. 1, 1907.

Application filed May 3, 1906. Serial No. 314,965.

*To all whom it may concern:*

Be it known that I, EZRA FAHRNEY, a citizen of the United States, and a resident of Deep River, in the county of Poweshiek and State of Iowa, have invented a new and Improved Road-Grader, of which the following is a full, clear, and exact description.

The purpose of the invention is to provide a machine that will plow and grade a road at the same time, in which series of spades have rotary coöperative action relatively to the plow, cross-cutting the furrow as turned up by the plow, which spades when they reach a certain point at the rear of the machine under the action of trip devices consecutively throw the dirt inward with such a quick motion that they scatter the dirt in direction of the crown or middle of the road, thus rendering it smooth, the spades acting with equally good results in dry, soft, soddy, or weedy roads.

Another purpose of the invention is to provide an inwardly-dished carrier for the spades and to so group the spades around the dished carrier that they will be quite close together, but independent in action, thus enabling one trip device to be used in connection with all the spades, and in the scattering and dumping action of the spades the formation of the carrier permits them to have more or less of an upward as well as an inward throw.

It is also a purpose of the invention to so shape the spades that they will cut transversely of the furrows and longitudinally at the land side, thereby cutting the sod in sections at each operation of the spade and providing each spade with a completely-loosened section to be removed from the furrow and scattered by the spades.

Another purpose of the invention is to provide mechanism for so setting the machine that the near horse will be enabled to walk in the furrow, thus dispensing with the necessity of the horse having to walk on the side of the bank, as in ordinary graders.

It is also the purpose of the invention to provide simple, reliable, and convenient means for raising and lowering the plow and to provide a gage at the land side of the plow which prevents the plow running too deep when crossing ridges.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the machine, some portions being shown broken away. Fig. 2 is a right-hand side elevation of the machine, parts being broken away. Fig. 3 is a transverse section taken practically on the line 3 3 of Fig. 1. Fig. 4 is a view of the land side of the plow and its standard, showing the applied stop; and Fig. 5 is a vertical section taken practically on the line 5 5 of Fig. 4.

The frame of the machine, as shown, consists of a right-hand side beam 10 and a left-hand side beam 11, a rear connecting-beam 12, and a forward connecting-beam 13. The forward connecting-beam 13 is provided with an extension 14 at its left-hand end, and the left-hand side beam 11 extends farther rearward than does the right-hand side beam 10 for purposes which will be hereinafter apparent. Boxes 15 are mounted upon the rear portions of the side beams 10 and 11, and in the said boxes a shaft 16 is mounted to revolve, which shaft extends beyond the left-hand side only of the frame, as is shown in Fig. 1.

At the right-hand side of the machine a small supporting-wheel 17 is mounted to turn on a stud-axle 18, which is adjustably secured to a hanger 19, that extends down from the right-hand side of the machine at the outer end of the journal-box 15 at that side, thus covering the end of the shaft 16, as is shown in Figs. 2 and 3. The adjustable connection between the said axle 18 and the hanger 19 is through the medium of a bolt 20, passed through the axle and through a longitudinal slot 21 in the hanger, the bolt having a nut 22 at its outer end, as shown in Fig. 3; but it will be understood that the said wheel 17 may be otherwise mounted without departing from the spirit of the invention.

What I term a "combined spreading and cutting wheel" C is mounted upon the left-hand projecting end of the axle 16. This wheel C is of peculiar construction. A disk 23 is provided with a hub 24 at its central portion, and this portion of the said disk is mounted on the said shaft, turning therewith through the medium of a feather 25, as is shown in Fig. 3. The inner face of the disk 23 is concaved or dished, as is particularly shown in Figs. 1 and 3. A series of ears 26 are radially produced upon or attached to the inner face of the disk 23 at its peripheral portion, and said ears 26 are arranged in pairs, as is shown in Figs. 1, 2, and 3. An elbow-lever c is pivoted between the ears 26 of each pair, and corresponding members of all of said levers are of equal length and are alike in construction.

The inwardly-extending or horizontal members 27 of the elbow-levers c pass through peripheral slots 28 in a circular guide-plate 29, which is secured on the shaft 16 by the aforesaid feather 25 and engages with the inner end of the hub 24, secured to the disk 23, as is shown in Fig. 3, so that the disk and the said guide-plate turn together, and the said members 27 of the elbow-levers c extend inwardly beyond the inner face of the guide-plate 29 for a purpose to be hereinafter mentioned. The outwardly-extending members 27ª of the said elbow-levers c extend beyond the edge of the disk 23. Preferably the outer or projecting ends of the members 27ª of the levers c are reduced and flattened, and the projecting portion of each member 27ª of an elbow-lever c is adapted to carry a spade. Each spade is of like construction and consists of an outer or land-side blade 30 as it is adapted to enter the land-side portion of a furrow and an inwardly-extending cutting-blade 31, which is straight at its outer or cutting edge, its inner edge being more or less inclined, as particularly shown in Fig. 3, and the outer or cutting edge of the cutting-blade 31 extends beyond the corresponding edge of the land-side blade of the spade, as is particularly shown at 32 in Figs. 2 and 3. The outer edge of the land-side blade 30 of each spade is more or less inwardly curved, as shown at 33 in Fig. 1, so as to better retain the earth between the members of a spade.

The inner end portions of the horizontal members 27 of the elbow-levers c engage with the peripheral portion of a cam E, which is secured to the left-hand side beam 11 in any suitable or approved manner, the shaft 16 passing through the center of said cam. The cam E is circular or disk-shaped, except that in the lower portion of its periphery a segmental recess 34 is made, and the deepest portion of this recess is at a point almost directly below the axle 16, as is shown in Fig. 2, and the recess 34 decreases in depth until it vanishes in the peripheral portion of the cam at its rear central part. The spades above mentioned are held rigid and in position for digging as long as the horizontal members 27 of their elbow-levers c remain upon the circular peripheral portion of the cam E; but as soon as a member 27 of a lever c reaches the top portion of the recess 34 in the cam a trip mechanism, to be hereinafter described, acts upon the said member to throw it upward for the full depth of the recess 34 at such point, and since this trip motion is quickly accomplished that particular spade is thrown upward and inward and its contents are discharged and spread over the road to the middle or crown thereof.

The release of one spade from its fixed position is not effected until the lever of the next forward spade has reached a position to be shortly acted upon by the trip mechanism, so that while all the spades are independent and are separated, yet they are close enough together to hold earth between them. It is evident that as the spades make the majority of their circuit in cutting position they act one after the other upon the furrow produced by the plow, cutting the same transversely by means of their blades 31, while their blades 30 drop down at the land side to scrape the earth therefrom, and as the plow in making the furrow loosens the earth at the bottom and cuts it away from the land side the transverse cutting of the blades 31 of the spades enables each spade in its movement to discharging position to take up a clod of earth.

A plow-standard 35 is secured to the extension 14 of the front beam 13 of the frame, and at the lower end of this standard 35 a peculiar form of plow F is located. The standard 35 is braced by a bar 36, attached thereto and loosely mounted on the outer left-hand end of the shaft 16, and is further braced by means of an arm 37. (Shown in Figs. 2 and 5.) The plow F consists of a landside 38, which is given a downward and forward inclination, (shown best in Fig. 4,) and a blade 39 at right angles to the landside, the said blade and the landside jointly terminating in a point 40. The rear right-hand end portion of the blade 39 is upwardly curved to a greater or lesser extent, as is shown at 41 in Figs. 2 and 5. This plow is so placed relatively to the frame that the spades on the combined cutting and scattering wheel C are immediately behind it, and in the operation of said wheel the land-side portions of spades will enter the furrow made by the plow F adjacent to the land side of said furrow, while the cutting-blades of the spades will operate to transversely chop or cut the upturned earth. With reference to the trip mechanism for the spades carried by the said wheel C, and which operate successively on the various spades, as stated, to throw them violently to discharging position, said mechanism is as follows: A rack 44 is secured to the rear beam 12 of the frame near its right-hand end, said rack being provided, preferably, with a series of apertures 45, and a lever 46 is pivoted to the central portion of the rack, which latter is segmental, and the lever has a pin 47, adapted to enter any one of the apertures 45 in the rack. A link 48 is pivotally attached to said lever, and it may be here stated that a lip 44ª extends from the rack 44 as a guide for the said link and to limit the downward movement of said lever. A spring 49 is attached to the link 48, and this spring is connected with the upwardly-extending crank-arm 50, secured to a shaft 51, which is journaled in suitable bearings in a shoe or stirrup 52, located at the left-hand side of the frame and extending from the front to the rear beams thereof, as best shown in Fig. 2. The shaft 51 extends out through the rear end of the said shoe, and at its rear end is provided with a crank-arm 53, as shown in Figs. 2 and 3, which crank-arm extends transversely of the machine in direction of the wheel C to a point over the blades of the spades carried by the wheel and to a point to the rear of the guide-plate 29, and this crank-arm 53 of the shaft 51 is provided with a drop-finger 54, which extends longitudinally and rearwardly of the machine to an engagement with the horizontal members 27 of the elbow-levers c outside of the guide-plate 29 when said members of the levers just about reach the recess 34 in the cam E, as is shown in Fig. 2. The spring 49, whose tension may be increased or decreased by the manipulation of the lever 46, tends to force the said trip-arm upward. Thus as soon as a member 27 of a lever c leaves the rack-surface of the cam and enters the recess 34 in the cam the trip-arm 54, which was formerly depressed by the said member, will immediately force the member it engages upward to the full extent of the depth of the recess 34, and thus will throw the spade carried by said lever upward and inward and cause the dirt held thereby to be scattered over the road-bed to the crown or middle portion of the same. In this construction it will be observed, as stated, that a single trip mechanism only is needed for the dumping or discharging operation of all the spades on the wheel C.

A reach 55 is provided for the body portion of the machine, and this reach has a yoke 56 at its forward end adapted to slide upon the axle 57 of a forward truck 58; but the connection is such that the forward end of the reach will not have vertical movement. The said reach near its forward end is provided with an upward curvature 59 to permit the passage of the wheels 60 of the forward truck when said truck is to be turned. The reach is provided at its rear end with a cross-bar 61, and this cross-bar 61 is secured to the end portions of hounds 62, and said hounds at their forward or bow portions extend over the reach and are secured thereto by a bolt 63 or its equivalent. At the extreme rear ends of the hounds 62 horizontal pintles 64 are formed, which are mounted to turn in brackets or bearings 65, pivotally secured to the forward portion of the forward beam 13 of the frame of the machine.

A forwardly and rearwardly inclined supporting-arm 66 is usually attached to the upper face of the reach 55 by the same bolt 63 securing the hounds, and this supporting-arm 66 is provided with upwardly-extending spaced members 67, each having a threaded aperture therein to receive the lower threaded end portion of an adjusting-screw 68, the upper end of which adjusting-screw is mounted to turn loosely in an opening in a standard 69, secured to the forward beam 13 of the frame. The said adjusting-screw 68 is given an upward and rearward inclination and terminates at its rear end in a hand-wheel 71 and is provided with a collar 72 near its rear end to prevent said screw from leaving the supporting-arm 66.

A preferably arched support 73 is secured to the standard 69 and to the rear beam 12 of the frame, on which arched support the driver's seat 74 is located, so that the hand-wheel 71 is convenient to the driver, and by turning the adjusting-screw 68 in one or the other direction the forward portion of the frame is raised and lowered to raise and lower the plow, as required. It may be here remarked that the plow is prevented from entering the ground to too great a depth when crossing ridges by the attachment of an angular stop 42 to the standard 35 just above the landside, as is shown particularly in Figs. 4 and 5, the horizontal member of the stop extending out at substantially right angles to the working face of the landside. This stop 42 is shown as secured to the plow-standard 35 by the same bolt 43 which secures the members 36 to said standard; but it will be understood that the stop 42 may be otherwise secured to a suitable support and may be secured in an adjustable manner. A shield 75 is erected at the forward left-hand portion of the frame in order to protect the occupant of the seat 74 from any particles which may be thrown from the spades in their upward passage.

A preferably triangular support 76 is made to extend from the front to the rear of the frame of the machine at the right-hand side of the seat-support 73, and at the front of this latter support 76, near the apex thereof, an adjusting-screw 78 is horizontally mounted to loosely turn in a bracket 77, carried by the support 76, and this adjusting-screw 78 is provided with an attached handle 79 at its inner end adjacent to the driver's seat 74. The adjusting-screw 78 when manipulated is adapted to move the reach 55 laterally, so that when desired the near horse can be made to travel in the furrow instead of being compelled to travel on the bank, as customary. Such an adjustment of the reach is accomplished by passing the threaded portion of the adjusting-screw 78 through a block 80ª, pivotally mounted in the upper forked end of a lever 80, which lever is fulcrumed, preferably centrally between its ends, upon a supporting-arm 81, secured to the frame. The lower end of said lever 80 is pivotally connected by a link 82 with the rear end of the reach 55, which rear end of the reach is independent of the frame, and owing to the dual pivotal connections between the hounds 62 and the frame of the machine it is obvious that by the manipulation of the adjusting-screw 78 the reach may be readily moved in direction of one or the other side of the machine.

This machine is of very simple construction for one of its kind. It is compact and may be constructed to combine lightness with duralbility, and said construction may be compassed at comparatively little cost. Furthermore, the machine is so constructed that it will plow the road and grade it at the same time and acts automatically in removing the dirt from the furrow and distributing it in proper shape over the road to the crown of the same.

Any desired means may be provided for raising the cutting-wheel C from engagement with the ground when the machine is being carried to and from the road to be operated upon, and means may likewise be provided for carrying the trip devices out of action when said wheel is out of action.

Having thus described my invention, I claim as new and desire to secure by Letters Patent—

1. In road-grading machines, a wheel adapted to operate upon the ground, a support therefor, spades pivotally mounted upon the wheel, means for normally holding said blades in a rigid position, and devices for tripping the spades to discharging position at a point in the rotation of the wheel.

2. In road-grading machines, a wheel adapted to operate upon the ground, a support for the wheel, spades pivotally mounted upon the wheel, each spade comprising an outer or landside blade and an inwardly-extending cutting-blade at an angle to the landside-blade, a device for normally holding said spades in rigid cutting position during the major portion of the rotation of the wheel, said device including likewise a releasing means brought into action when the spades reach a lower rear position, and devices for tripping the spades to discharging position when they reach the said lower rear position.

3. In road-grading machines, a wheel adapted to operate upon the ground, a support therefor, a series of spades of substantially L-shaped construction mounted upon the wheel, members extending inward from the pivotal portions of the spades, a fixed cam having a peripheral supporting and guide surface for the said members of the spades and a recessed or releasing surface therefor, and a tension-controlled trip-bar which acts upon said members when said releasing-surface of the cam is reached to throw and raise the spade thus acted upon in direction of the middle of the road to dump and spread its load.

4. In road-grading machines, a dished wheel, a support therefor, angle-levers pivoted upon the concaved face thereof, each comprising an inwardly and an outwardly projecting member the latter of which extends beyond the periphery of the wheel, spades secured to the outwardly-projecting members of the levers and adapted for consecutive engagement with the ground as the wheel revolves, a cam fixed to the support, having a circular peripheral surface and a recess at the rear lower central portion of said surface, with which peripheral surface of the cam the said inwardly-extending lever members engage, said spades being held rigid while said inwardly-extending lever members are in engagement with the true surface of the cam, being released when the recessed portion is reached, and a tension-controlled trip device which automatically acts upon the inwardly-extending members of the levers to force the spades carried thereby violently inward with an upward inclination.

5. In a road-grading machine, a wheeled support, a shaft mounted to revolve on the support, extending beyond one of its sides, a disk having its inner surface concaved, secured upon the projecting portion of the shaft, angle-levers pivotally mounted at the inner face of the disk, the outwardly-extending members of said levers projecting beyond the periphery of the disk, a spade carried by the projecting portion of the outer members of the said levers, each spade comprising an outer moldboard-blade and an inwardly-extending transverse cutting-blade, a slotted guide for the inwardly-extending members of the said levers, mounted to rotate also with the said shaft, a fixed cam through which the shaft passes, which cam has a true circular peripheral surface for the major portion of its circumference, being provided with a recess in its periphery at its rear lower portion, the inwardly-projecting members of said levers being adapted to travel over the peripheral surface of the cam, and a tension-controlled ajustable trip device adapted for automatic action upon the inwardly-extending members of the said levers when said members reach the recessed portion of the cam.

6. In a road-grading machine, the combination with a wheeled support, a shaft mounted to revolve on the support, extending beyond one of its sides, a disk having its inner surface concaved, secured upon the projecting portion of the shaft, angle-levers pivotally mounted at the inner face of the disk, the outwardly-extending members of said levers projecting beyond the periphery of the disk, a spade carried by the projecting portion of the outer members of said levers, each spade comprising an outer moldboard-blade and an inwardly-extending transverse cutting-blade, a slotted guide for the inwardly-extending members of said levers, mounted to rotate also with the said shaft, a fixed cam through which the shaft passes, which cam has a true circular peripheral surface for the major portion of its circumference, being provided with a recess in its periphery at its rear lower portion, the inwardly-projecting members of said levers being adapted to travel over the peripheral surface of the cam, and a tension-controlled adjustable trip device adapted for automatic action upon the inwardly-extending members of the said levers when said members reach the recessed portion of the cam, of a plow-standard supported in front of the said spades, and a plow secured to the said support, comprising a moldboard in longitudinal relation to the moldboard-blades of the spades, and a horizontal blade-section at the lower end of the landside, the blade-section and landside terminating in a point, the cutting-blades of said spades being adapted for cutting action on the ground turned up by the blade of the plow.

7. In a road-grading machine, a support, a rotating digging-wheel carrying a number of spades adapted for engaging with the ground, means for holding said spades rigid throughout the major portion of the rotation of the wheel, trip devices for the spades, acting thereon when the said spades reach the lower rear position relative to the support, and a plow adapted to the said support located in front of the said wheel, the said plow producing a furrow into which the spades of the said wheel track.

8. In a road-grading machine, a support, a rotating digging-wheel carrying a number of spades adapted for engagement with the ground, means for holding said spades rigid throughout the major portion of the rotation of the wheel, and trip devices for the spades, acting thereon when the said spades reach a lower rear position relative to the support, and a plow adapted to the said support, located in front of said wheel, the said plow producing a furrow into which the spades of the said wheel track, and a stop at the landside portion of the plow, whereby to prevent the plow furrowing too deep when crossing ridges.

9. In a road-grading machine, a wheeled support, a plow carried thereby, and a stop at the landside of the plow to limit the depth of cut of the plow when crossing ridges.

10. In a road-grading machine, a wheeled support, a plow carried thereby and a stop at the landside of the plow to limit the depth of cut of the plow when crossing ridges, the said plow consisting of a landside-section and a horizontal blade-section having its outer edge portion upturned, the blade and landside sections terminating forwardly in a point, and means for raising and lowering the forward section of the support.

11. In a road-grading machine, the combination with a wheeled support and a reach or tongue having pivotal and swinging connection with the support, of an adjusting mechanism carried by the support and connected with the inner end portion of said tongue or reach to impart lateral adjustment thereto, for the purpose specified.

12. In a road-grading machine, the combination with a wheeled support, of a tongue or reach pivotally connected therewith and having lateral adjustment thereon.

In testimony whereof I have signed my name to this specification in the presence of two subscribing witnesses.

EZRA FAHRNEY.

Witnesses:
   J. S. BURGETT,
   BENJ. W. GRIER.